June 3, 1930.  E. P. McCLURE  1,761,354
COFFEEPOT
Filed Aug. 20, 1928
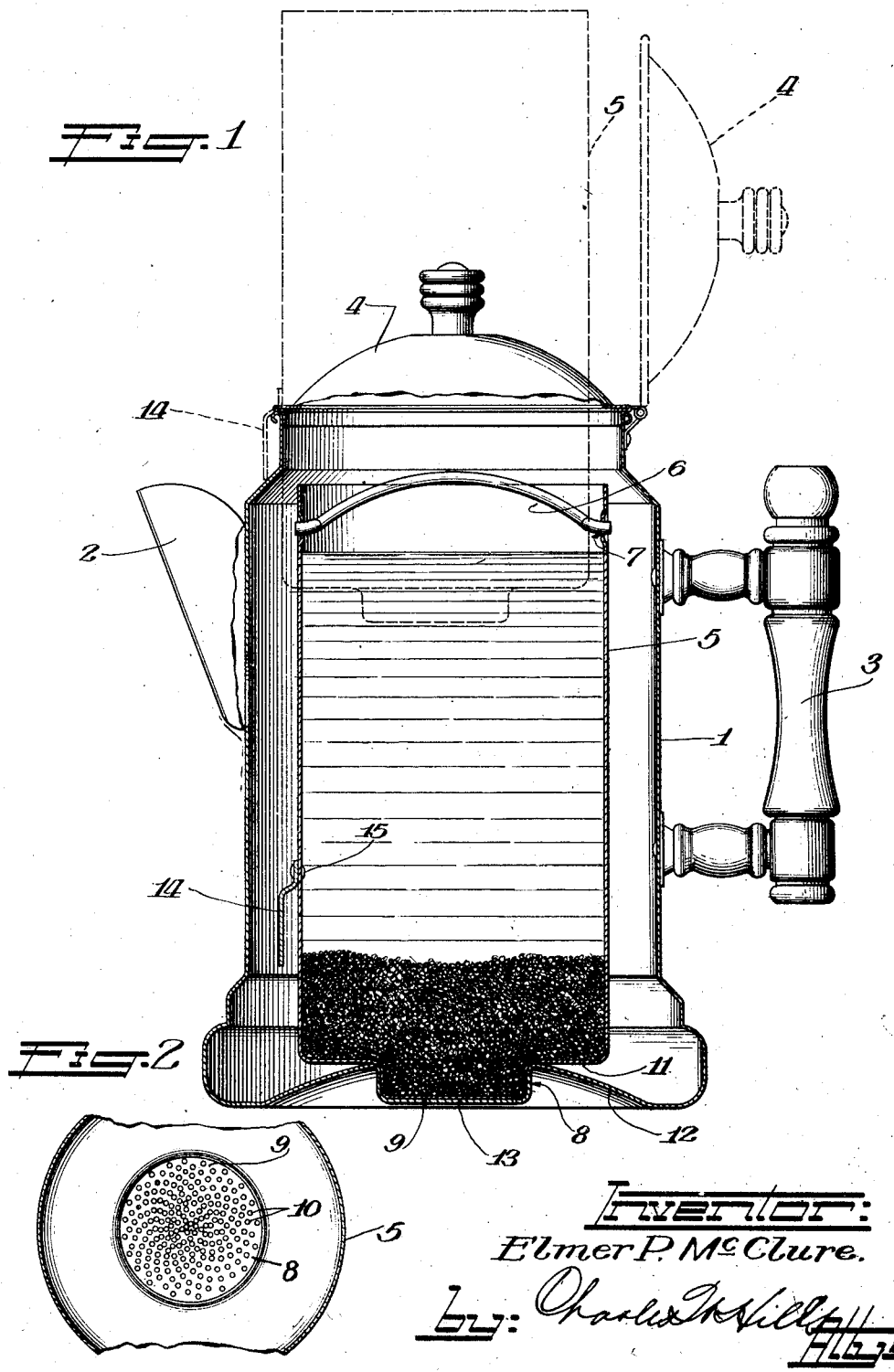
Inventor:
Elmer P. McClure.

Patented June 3, 1930

1,761,354

UNITED STATES PATENT OFFICE

ELMER P. McCLURE, OF WESTERN SPRINGS, ILLINOIS, ASSIGNOR TO ALUMINUM PRODUCTS COMPANY, OF LA GRANGE, ILLINOIS, A CORPORATION OF ILLINOIS

COFFEEPOT

Application filed August 20, 1928. Serial No. 300,626.

This invention relates to a coffee pot for making drip coffee.

An object of the invention is to provide a coffee pot by which clear drip coffee may be made.

Another object is to provide a coffee pot constructed to prevent material escape of water through the ground coffee except in drip position.

A further object is to provide a new improved coffee pot construction whereby drip coffee may be readily and successfully made.

According to the invention, a container having a portion of its bottom perforated, is arranged within a coffee pot and the coffee pot bottom and container bottom have contacting surfaces for preventing outflow of finely ground coffee particles while in such position.

The above, other and further objects, will be apparent from the following description, drawings, and appended claims.

One form of the invention is illustrated in the accompanying drawings and the views are as follows:

Figure 1 is a side elevational view partially in section, of an embodiment of the invention.

Figure 2 is a fragmental bottom plan view of the container.

As shown in the drawings:

The coffee pot 1 is provided with a spout 2, a handle 3, and a cover or lid 4. The lid 4 is shown as hinged to the pot although a removable cover may be used if desired.

The container 5 of substantially the same length as the coffee pot fits within the pot and is freely movable in the same. The upper end of the container 5 is open and it is provided with a handle or bail 6 loosely hinged at 7 to the container.

Centrally of the bottom of the container 5 is a cylindrical projection 8 formed by drawing. The bottom 9 of the projection is provided with a plurality of small openings 10 through which the water drips.

The diameter of the cylindrical projection 8 is less than the diameter of the container 5 with the portion 11 of the bottom between the projection 8 and the side walls of the container being imperforate.

The bottom 12 of the pot is made convex inwardly and is provided with a cylindrical central depression 13 in shape and size to receive the projection 8 of the container and have the projection fit snugly within the depression.

A hook 14 is riveted at 15 to the container towards the bottom of the same for hooking over the upper end of the pot 1 when the container is raised to drip position which is that shown in dotted lines in Figure 1.

The lid 4, of course, is open when the container 5 is elevated.

Drip coffee is made in the pot of the invention by putting into the container 5 a proper amount of the coffee in properly ground condition. The container is then placed in the pot 1 with the projection 8 thereof fitting into the depression 13 of the pot. Boiling water is then poured into the container 5 to make the coffee of requisite strength from the coffee in the container. The container is allowed to remain in the position shown in full lines in Figure 1, for a few moments, whereupon it is raised to the dotted line position until all of the water therein has dripped through the coffee and the perforations 10 in the bottom of the projection 8 into the lower part of the pot. Should this coffee be not strong enough then the container may be lowered into the position shown by full lines in Figure 1, whereupon the water will flow back through the coffee into the container and it may again be raised until the coffee drips through a second time.

The container may be removed from the pot when serving if it is desired or may be lowered into the full line position, the coffee being poured out of the pot through the spout.

Other than drip coffee may be made with the pot of this invention but it is designed primarily for making drip coffee.

The purpose of the projection 8 on the container and the depression 13 in the bottom of the pot is to prevent the passage of any solid coffee such as finely ground coffee into the pot prior to the time the dripping is permitted, that is, when the container is raised to dotted line position of Figure 1. Any seepage which occurs is seepage of liquid only and this does not have any ill effect on the finished coffee. I have found that the coffee pot constructed in accordance with this invention will make clear drip coffee. This is accomplished by checking or preventing the escape of any small solid coffee particles into the pot prior to the time the container is raised. Coffee pots in use at the present time for making drip coffee are not suitable for producing clear coffee because powdered coffee passes into the pot before the essence has been extracted by the drip process with the result that the coffee is muddy or cloudy.

While I describe more or less precisely the details of my invention yet I do not wish to be understood as limiting myself thereto as I am aware that changes may be made in the arrangement and proportion of parts and that equivalents may be substituted although without departing from the spirit and scope of my invention.

I claim as my invention:

1. A coffee pot having a lid, the bottom of said pot being convex inwardly with a central cylindrical depression formed in said bottom, a container freely movable in said pot, the bottom of said container having a cylindrical projection of such size as to snugly fit the depression in the pot bottom to restrain outflow of solid matter from said container while said projection is in said depression, the bottom of said cylindrical projection being perforated, means for raising said container, and a hook on said container for securing the same in the upper end of said pot in raised position.

2. A coffee pot having an inwardly dished bottom with a downwardly extending pocket formed therein, a coffee container movable within said pot and having a projection with a perforated bottom at its lower end shaped to conform to and tightly fit within said pocket to prevent passage of coffee grounds through said container perforations when in said pocket.

In testimony whereof I have hereunto subscribed my name at Chicago, Cook County, Illinois.

ELMER P. McCLURE.